Patented Nov. 7, 1939

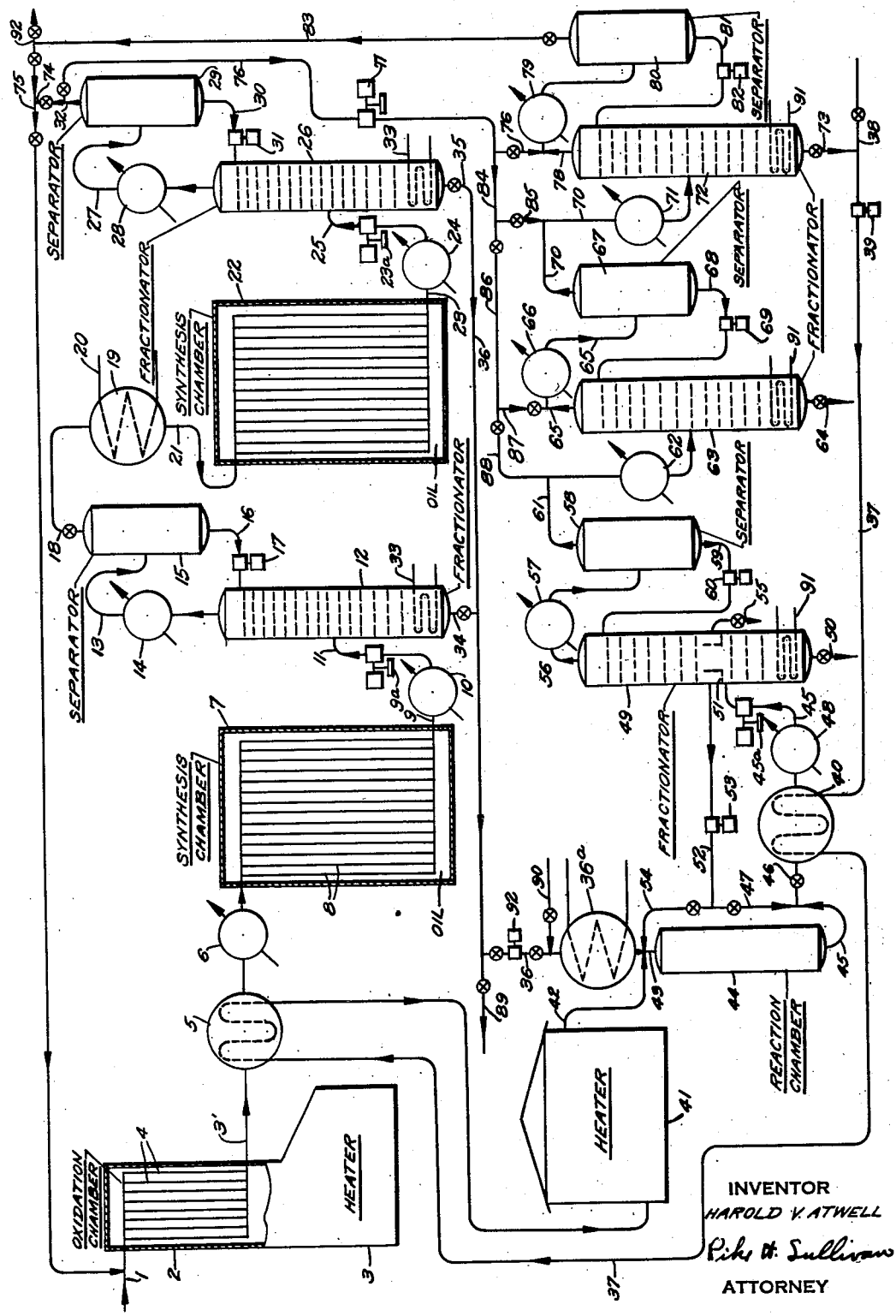

2,178,824

UNITED STATES PATENT OFFICE 2,178,824

CONVERSION OF GASEOUS HYDROCARBONS

Harold V. Atwell, White Plains, N. Y., assignor to Process Management Company, Inc., New York, N. Y., a corporation of Delaware Application January 6, 1937, Serial No. 119,178

7 Claims. (Cl. 196—9)

This invention relates to the production of normally liquid hydrocarbons from a gaseous mixture consisting essentially of carbon monoxide and hydrogen, or from a gaseous stream which can be converted into a mixture consisting essentially of carbon monoxide and hydrogen. More particularly, the invention relates to the production of normally liquid hydrocarbons, including products in the motor fuel boiling range, from normally gaseous hydrocarbons of low molecular weight, such as methane and ethane.

The invention contemplates the treatment of a gaseous stream consisting of carbon monoxide and hydrogen preferably in the ratio of approximately 1:2 in the presence of a suitable catalyst under proper conditions of temperature and pressure to cause the synthesis of hydrocarbons of greater molecular weight including normally liquid hydrocarbons.

Simultaneously a stream of normally gaseous hydrocarbons consisting chiefly of hydrocarbons having 3 and 4 carbon atoms per molecule is heated under conditions of temperature and pressure to promote cracking and/or conversion to hydrocarbons of greater molecular weight including normally liquid hydrocarbons.

This may be done by subjecting the gases to conditions of high temperature and low pressure whereby conversion to aromatic hydrocarbons occurs or by subjecting them to conditions of high pressure and lower temperature whereby conversion to aliphatic hydrocarbons is the predominating reaction. The gaseous stream so heated is admixed with the reaction products of the carbon monoxide-hydrogen reaction whereby the hot gases are cooled and the carbon monoxide-hydrogen reaction products are heated in admixture with the hot gases and their conversion reaction products with the result that the production of undesirably heavy products in the conversion reaction is inhibited and the carbon monoxide-hydrogen reaction products are improved in quality as motor fuel by conversion reactions which may include cracking, polymerization, dehydrogenation and other reactions.

When the gaseous hydrocarbon stream is heated under high pressure, cracking and conversion apparently proceed simultaneously, and the carbon monoxide-hydrogen reaction products preferably are added near the end of the heating operation, although a soaking period may be employed thereafter to permit conversion reactions to proceed and during this period heat may be applied to maintain the temperature of the mixture above a desired minimum.

When the gaseous stream is heated to a high temperature under low pressure substantial cracking apparently occurs prior to substantial conversion or polymerization. In this case, therefore, it is preferable to add the carbon monoxide-hydrogen reaction products to the heated gaseous stream prior to substantial conversion whereby the exothermic heat developed by the subsequent conversion reactions promotes conversion of normally liquid reaction products and conversion of gaseous reaction products.

The mixture is thereafter fractionated to separate therefrom gasoline and other liquids, and the remaining gases are fractionated to recover a fraction consisting essentially of $C_3$ and $C_4$ hydrocarbons suitable for thermal conversion to hydrocarbons of greater molecular weight and the remaining gases which may include hydrogen, methane, and any ethane and ethylene undesired in the fraction for thermal conversion may be withdrawn for use in producing the carbon monoxide-hydrogen mixture.

The carbon monoxide-hydrogen mixture may be produced in any suitable way, but in the preferred manner of this invention a stream of hydrocarbons, such as methane and ethane, is catalytically oxidized to produce a mixture of carbon monoxide and hydrogen in the desired proportions. The raw material will consist ordinarily chiefly of methane because of the relative abundance of that hydrocarbon in natural gas, refinery gases resulting from oil cracking and in lighter gases resulting from the thermal polymerization of higher molecular weight hydrocarbons, any or all of which constitute the preferred raw material for the process of the present invention, although carbon monoxide and hydrogen from any suitable sources may be employed.

The invention contemplates the catalytic oxidation of a gas consisting essentially of methane, ethane, or ethylene to produce a mixture of carbon monoxide and hydrogen. To such a gaseous stream undergoing oxidation may be added the gases from the polymerization reaction products which are unsuitable for recycling to the polymerization reaction and any similar gases occurring in the reaction products of carbon monoxide and hydrogen, which may include some unconverted carbon monoxide and hydrogen. The catalytic oxidation products of such a mixture may contain too much of one or the other of the desired components so that it may be necessary to provide a separate source of one or the other for addition to the gaseous stream after the catalytic oxidation reaction. For example, the gases from the polymerization reaction may contain excess hydrogen whereby the oxidation reaction products will contain hydrogen in excess of the desired proportion. Carbon monoxide from a separate source may therefore be added to adjust the ratio of the essential components.

The accompanying drawing is a diagrammatic plan view illustrating an embodiment of the present invention. It is to be understood, however, that the invention is capable of other improvements within the disclosure but beyond the physical limitations of the apparatus indicated in the drawing. The invention will be further described, with reference to the drawing for purposes of illustration, but it is to be understood that such specific description is illustrative only.

Referring to the drawing, a gaseous stream which consists essentially of oxygen and methane and may include ethane and ethylene is introduced to the system through line 1 and passes to a catalytic oxidation chamber 2 which is provided with a heater 3 for obtaining the proper temperature conditions for the oxidation reaction. Oxidation chamber 2 may consist of a plurality of tubes arranged in parallel between suitable headers and containing a suitable catalyst such as a mixture of 90 parts nickel oxide and 10 parts of a promoter such as thoria on a suitable carrier such as fire clay or magnesia. The temperature for maximum oxidation will vary with the catalyst employed but ordinarily should be in the range of 900°–1500° F. Ordinarily atmospheric pressure is employed. The oxidation reaction is only slightly exothermic so that it may be necessary to provide suitable means to maintain the desired reaction temperature. For this reason the catalyst is suitably maintained in tubes 4 through which the reaction mixture is passed, to permit the passage of suitably heated gases on the outside of the tubes to maintain the reaction temperature, and to obtain maximum contact of the catalyst and gaseous mixture through the subdivision of the gaseous stream in the plurality of tubes 4 of the oxidation chamber.

The oxidation reaction products emerge from the oxidation chamber 2 by means of line 3' and may be treated to adjust the ratio of carbon monoxide to hydrogen and to remove undesirable components such as sulphur compounds. The oxidation reaction products may suitably pass through a heat exchanger 5 wherein they pass in indirect contact with fresh feed for the thermal polymerization reaction and are cooled thereby, after which they may be passed through a cooler 6 whereby the exact temperature required for the succeeding operation is obtained. From the cooler 6 the oxidation reaction products which consist essentially of carbon monoxide and hydrogen in the desired proportions are passed through a synthesis chamber 7 which suitably consists of a plurality of tubes 8 arranged in parallel between suitable headers and maintained in a fluid bath which serves the purpose of maintaining the proper reaction temperature. The tubes 8 are preferably rectangular in cross section with one cross sectional dimension greatly in excess of the other whereby a relatively narrow passageway is provided. The tubes 8 are provided with a suitable catalyst for the conversion of carbon monoxide and hydrogen to hydrocarbons of greater molecular weight, for example, metallic cobalt on a carrier such as kieselguhr with a promoter such as thoria. The gases should be maintained at a temperature of approximately 365° to 415° F. at atmospheric pressure for maximum conversion. The gases may be suitably cooled to the required temperature in the cooler 6 before entering synthesis chamber 7 and may be maintained at the proper temperature by the bath of oil or other suitable fluid surrounding the tubes 8, which serves to remove the exothermic heat of reaction. Means not shown are provided to circulate and cool the bath of oil, etc. to maintain the desired temperature therein.

The rate of this reaction is relatively low whereby it is necessary to provide a relatively large reaction chamber to secure complete conversion of the carbon monoxide and hydrogen. This may be done by providing a single large chamber or preferably by providing one or more additional chambers with removal of liquids formed from the stream after passage through each chamber. For purposes of illustration the drawing includes two such chambers, but it is to be understood that any suitable number may be employed without departing from the method of operation illustrated in the drawing.

The reaction products from synthesis chamber 7 may be withdrawn from chamber 7 through line 9 and will contain unconverted carbon monoxide and hydrogen and hydrocarbons of greater molecular weight including normally liquid hydrocarbons. This mixture is suitably passed to a cooler 10 wherein it is cooled to a temperature sufficient to condense the normally liquid hydrocarbons and any desired portion of the normally gaseous hydrocarbons suitable for polymerization such as hydrocarbons having 3 and 4 carbon atoms per molecule. The thus cooled reaction products are passed through line 11 to a fractionator 12 wherein the liquid constituents are collected in the bottom of the fractionator, and the constituents which it is desired to maintain in the gaseous form pass overhead. To facilitate fractionation superatmospheric pressure may be maintained in fractionator 12. In this case a compressor 9a may be provided in line 11 to force the gases therein into the fractionator 12. For example, conditions of temperature and pressure may be maintained in the fractionator 12 whereby only the normally liquid hydrocarbons are condensed or whereby a portion of the heavier normally gaseous hydrocarbons such as those having 3 and 4 carbon atoms per molecule are condensed together with the normally liquid hydrocarbons. The uncondensed gases pass overhead from fractionator 12 through line 13 and a cooler 14 wherein they may be cooled to condense a portion thereof after which the stream passes to a separator 15 in which liquefied components are separated and returned to the fractionator 12 as reflux through line 16 by means of pump 17. The uncondensed gases pass overhead from the separator 15 through line 18 and a heat-exchanger or heater 19 which is provided with a source of heat which suitably may be a steam coil 20. It is ordinarily necessary to heat these overhead gases inasmuch as they are ordinarily cooled by the preceding operations to a temperature below that necessary for synthesis. From the heat exchanger 19 the gases are passed at the desired temperature through line 21 to synthesis chamber 22 which may be identical in construction with synthesis chamber 7 and including the same type of catalyst in the parallel tubes so that no detailed description of this chamber will be given. In synthesis chamber 22 substantially all the carbon monoxide and hydrogen remaining in the gaseous stream is converted to hydrocarbons of higher molecular weight. The reaction products may be withdrawn from chamber 22 through line 23 and may consist of any remaining unconverted hydrogen and carbon monoxide, normally liquid hydrocarbons formed in chamber 22, normally gaseous hydrocarbons formed in chamber 22 and normally gaseous hydrocarbons formed in chamber 7 and not removed by condensation in fractionator 12. Reaction products passing from chamber 22 through line 23 may be suitably cooled in cooler 24 and passed through line 25 to fractionator 26 wherein a separation of liquid and gases is obtained. If superatmospheric pressure is maintained in fractionator 26 a compressor 23a may be provided in line 25. For example, conditions of temperature and pressure may be maintained in fractionator 26 whereby the normally liquid hydrocarbons and the normally gaseous hydrocarbons suitable for thermal polymerization such as those having 3 and 4 carbon atoms per molecule are condensed and collected in the bottom of the fractionator. The uncondensed gases pass overhead from fractionator 26 through line 27 and cooler 28 wherein partial condensation occurs. The cooled gases are then passed to separator 29 wherein occurs separation of liquefied constituents which are collected and returned as reflux to the fractionator 26 through line 30 by means of pump 31. Uncondensed gases pass overhead from the separator 29 through line 32.

Heating means 33 are provided in the bottoms of the fractionators 12 and 26 to maintain the liquids collected therein at the temperature necessary to prevent the inclusion of undesired constituents. The liquids collected in fractionators 12 and 26 are withdrawn therefrom through lines 34 and 35, respectively, and pass through line 36 to admixture with a stream of gaseous hydrocarbons such as those having 3 and 4 carbon atoms per molecule which has been heated under conditions of temperature and pressure to cause cracking and conversion to hydrocarbons of greater molecular weight.

Simultaneously with the synthesis of hydrocarbons from carbon monoxide and hydrogen in the synthesis chambers 7 and 22, as described above, a stream of normally gaseous hydrocarbons, comprising essentially those having 3 and 4 carbon atoms per molecule but including also, if desired, those having 2 atoms per molecule, is passed through line 37 to thermal conversion means. These hydrocarbons may consist entirely of those produced in the system or may include hydrocarbons added to the system, through line 38. By means of pump 39 this stream of hydrocarbons is passed through heat exchangers 40 and 5 wherein it passes in indirect contact with heated reaction products and serves to cool the reaction products while being itself suitably preheated. The preheated gases are then introduced to a heater 41 wherein they are heated under suitable pressure and to a suitable temperature to cause cracking of paraffins and to promote conversion to hydrocarbons of greater molecular weight.

The gases may be heated under high pressure to promote the cracking of paraffins and the conversion of a portion of the gases to hydrocarbons of greater molecular weight. Under such conditions the operation of the heater 41 is regulated whereby the gases receive substantially all the heating required to promote conversion within the heater. The heated gases are then mixed with the reaction products from the synthesis of carbon monoxide and hydrogen which are introduced to the gases which emerge from the heater through line 42 by means of line 36 which is provided with a pump 92, if necessary, to overcome the pressure maintained in line 42. The resulting mixture is passed through line 43 to a reaction chamber 44 wherein intimate contact of the constituents of the mixture is provided with resulting conversion of the normally liquid hydrocarbons produced by the synthesis of carbon monoxide and hydrogen, and conversion of normally gaseous paraffins and olefins together with cooling of the hot gases to inhibit the production of undesired heavy products.

The reaction chamber 44 may be dispensed with and the carbon monoxide-hydrogen reaction products admixed with the hot gases within the heater 41 in a portion of the coil located within a cooler part of the heater. If necessary, heat may be applied externally to the reaction chamber 44 to maintain the temperature of the mixture therein above a desired minimum.

Under the conditions of operation just mentioned above the heater 41 may be operated to provide a temperature of 750° to 1100° F. in the hot gases leaving the heater under a pressure of 750 to 3000 pounds per square inch. The heater 41 may be operated under different conditions to produce conversion products having different characteristics. For example, the heater 41 may be operated at a higher temperature, for example, 1200° to 1500° F. and at lower pressure, for example, 0 to 200 pounds per square inch to produce conversion products in which aromatic constituents predominate. Under these conditions of operation the heater 41 may be operated whereby the gases emerge from heater 41 through line 42 before substantial conversion, such as polymerization of olefins, occurs. The heated gaseous hydrocarbons from such high-temperature, low-pressure operation are then mixed with the products from the synthesis of carbon monoxide and hydrogen in chambers 7 and 22 passing through line 36 which is provided with a pump 92. The resulting mixture is passed through line 43 to a reaction chamber 44 wherein the exothermic heat of conversion maintains the mixture at a temperature which will cause conversion of the liquids produced by the synthesis of carbon monoxide and hydrogen by means of simultaneous cracking and conversion and the conversion of at least a portion of any normally gaseous hydrocarbons produced by the reaction of carbon monoxide and hydrogen and included with the liquid products so produced.

The use of a reaction chamber, such as chamber 44, is not essential if it is desired that the conversion reaction take place in a portion of the coil of the heater 41 located in a cooler part of the heater. In that case the relatively cool material passing through line 36 is introduced in the furnace into the coil at an intermediate point whereby the combined streams thereafter pass through a cooler part of the heater. If desired, the carbon monoxide-hydrogen reaction products may be preheated in heater 36a located in line 36 prior to admixture with the hot gases from heater 41 by heat exchange, for example, with hot gases or liquids from another part of the system.

The reaction products, including fixed gases, heavier normally gaseous hydrocarbons, and normally liquid hydrocarbons resulting from the synthesis of carbon monoxide and hydrogen and the conversion of normally gaseous hydrocarbons, emerge from the reaction chamber 44 through line 45 which, if necessary, is provided with a pressure release valve 46 whereby the pressure on the reaction products is reduced to the desired degree. To reduce the temperature of the reaction products to inhibit further reaction and prevent the formation of undesired heavy products, cooling liquid, such as gas oil, may be introduced into the reaction products before any reduction in pressure, for example, through line 47. After any reduction in pressure the reaction products pass through the heat exchanger 48 in indirect contact with the fresh feed for the heater 41 whereby the temperature of the reaction products is further reduced. The reaction products are then passed through a cooler 48 to effect a further reduction in temperature and are then introduced into a third fractionator 49. If the gases are maintained under low pressure in the heater 41 a compressor 45a may be provided in line 45 to force the gases into the fractionator 49 in case it is desired to maintain the fractionator 49 and succeeding fractionators under superatmospheric pressure to facilitate fractionation.

In the fractionator 49 conditions of temperature and pressure are maintained to liquefy constituents heavier than those in the gasoline boiling range and permit the passage overhead as a gaseous and/or vaporous stream of the hydrocarbons in the gasoline boiling range and those which are normally gaseous together with any fixed gases. The heaviest oils condensed in the fractionator 49 collect in the bottom thereof and are withdrawn from the system through line 50. A side stream consisting of clean gas oil may be collected in a trap-out tray 51 located above the point of introduction of the reaction products in line 45. A portion or all of the gas oil in the trap-out tray 51 may be withdrawn through line 52 by means of a pump 53 and passed through line 47 to admixture with the hot reaction products. Also a portion of the gas oil from the trap-out tray 51 may be passed through lines 52 and 54 to admixture with the hot gases from the heater 41 and the material from line 36. If desired, a portion of the gas oil collected by the trap-out tray 51 may be withdrawn from the system through line 55.

The overhead gases in fractionator 49 pass from the fractionator through line 56 and are further cooled by passage through a cooler 57 whereby a portion thereof is liquefied. The cooled gases pass from the cooler 57 to a separator 58 wherein liquefied constituents are collected and are returned to the fractionator 49 as reflux through line 59 by means of a pump 60. The uncondensed hydrocarbons consisting of gasoline, lighter hydrocarbons, and fixed gases pass overhead from the separator 58 through line 61 and a cooler 62 wherein they are further cooled as a preliminary to their introduction to a fourth fractionator 63. In fractionator 63 conditions of temperature and pressure are maintained to accomplish the condensation of the hydrocarbons in the gasoline boiling range and to produce a stabilized gasoline which collects in the bottom of the fractionator 63 and is withdrawn from the system through line 64. The uncondensed gases, which consist of normally gaseous hydrocarbons and hydrogen, pass overhead from the fractionator 63 through line 65 and a cooler 66 to accomplish the condensation of a portion thereof. The cooled gases are passed from cooler 66 to a separator 67 wherein liquefied constituents are collected and returned to the fractionator 63 as reflux through line 68 by means of a pump 69.

The uncondensed gases from the separator 67, consisting of normally gaseous hydrocarbons and hydrogen, pass overhead through line 70 and a cooler 71 to a fifth fractionator 72.

In fractionator 72 conditions of temperature and pressure are maintained to accomplish the condensation of the normally gaseous hydrocarbons desired for passage to the conversion heater 41. These ordinarily include the $C_3$ and $C_4$ hydrocarbons together with any desired proportion of $C_2$ hydrocarbons. The condensate collects in the bottom of the fractionator 72 and is withdrawn through line 73 and passed through line 37 to the heater 41 after admixture with any fresh feed introduced to the system through line 38.

The synthesis of hydrocarbons of greater molecular weight from carbon monoxide and hydrogen may be controlled to produce reaction products mainly paraffinic in nature or to produce reaction products containing a substantial proportion of olefins. This is accomplished by adjusting the ratio of carbon monoxide and hydrogen in the synthesis reaction feed. For example, increasing the carbon monoxide-hydrogen ratio from the 1:2 ratio results in increased olefin content in the reaction products, whereas a decrease in this ratio reduces the proportion of olefins present in reaction products.

Therefore, the reaction products of the synthesis of the carbon monoxide and hydrogen emerging from synthesis chambers 7 and 22 may be high or low in olefins depending upon the desired reaction conditions. For maximum production of hydrocarbons of higher molecular weight the ratio of carbon monoxide and hydrogen is ordinarily lower than 1:2. Under these conditions the reaction products from chambers 7 and 22 will be relatively low in olefinic content. Where the reaction products are low in olefinic content it is preferable to operate the fractionators 12 and 26 under conditions of temperature and pressure whereby normally liquid products are condensed therein and collected for passage through line 36 as a cooling medium for the hot gases from the heater 41 and whereby normally gaseous hydrocarbons together with unconverted carbon monoxide and hydrogen pass overhead from fractionators 12 and 26 through lines 18 and 32, respectively.

Where the reaction products of the synthesis of carbon monoxide and hydrogen are relatively rich in olefins it may be desired to condense all or a portion of the normally gaseous hydrocarbons, such as the $C_3$ and $C_4$ hydrocarbons, together with the normally liquid reaction products in the fractionators 12 and 26 for passage through line 36 to admixture with the hot gases from the heater 41 whereby the normally gaseous olefins may be subjected to conditions promoting their conversion to products of higher molecular weight.

Where the heavier normally gaseous hydrocarbons such as $C_3$ and $C_4$ hydrocarbons in the reaction products of the synthesis of carbon monoxide and hydrogen are condensed in fractionators 12 and 26 along with the normally liquid constituents the gases passing overhead from the second fractionator 26 through line 32 will consist of unconverted carbon monoxide and hydrogen, methane and any $C_2$ hydrocarbons undesired for passage to admixture with the hot gases from heater 41. These gases may be passed through lines 74 and 75 to admixture with the fresh feed being introduced to the system through line 1 whereby they are admixed with the low molecular weight hydrocarbons being oxidized in oxidation chamber 2 to produce a gaseous stream consisting of hydrogen and carbon monoxide. If desired, these gases may be pressed instead through line 76 by means of compressor 77 to admixture with the overhead gases from the fractionator 72 which pass therefrom by means of line 78. The overhead gases from fractionator 72 together with any gases conducted through line 76 pass through a cooler 79 wherein heavy constituents undesired in the recycle gases to the oxidation chamber 2, or constituents desired in the recycle stream to the heater 41, are condensed. The cooled gases pass from the cooler 79 to separator 80 wherein the liquefied constituents are separated and returned to the fractionator 72 as reflux through line 81 by means of pump 82. The uncondensed gases from the separator 80 pass overhead through line 83 and are recycled to admixture with the fresh feed passing to oxidation chamber 2 through line 75, as described above. If desired, all or a portion thereof may be diverted from the system through line 92.

Alternatively, all or a portion of the gases passing from the separator 29 through line 76 may be passed through lines 84 and 85 to admixture with the overhead gases from the separator 67 after which the mixture is passed through cooler 71 and into the fractionator 72, as described above.

In case the gases passing overhead from the separator 29 through line 76 contain any gasoline constituents which it is desired to retain in the gasoline fraction they may be passed through lines 84, 86 and 87 to admixture with the gases passing overhead from the fractionator 63 through line 65 after which they pass through the cooler 66 wherein gasoline constituents are condensed, as described above.

If the fractionators 12 and 26 are operated to permit the passage overhead from separators 15 and 29 of the normally gaseous hydrocarbons such as $C_3$ and $C_4$ hydrocarbons all the overhead gases from separator 29 will be passed through line 76 and be disposed of by admixing them with the overhead gases from fractionators 63 or 72 or separator 67, as described above, whereby the heavier normally gaseous hydrocarbons such as $C_3$ and $C_4$ hydrocarbons will be collected in fractionator 72 and combined with the recycle stream passing through line 73.

It may be desired to pass only the heavier liquid constituents of the reaction products from the synthesis of carbon monoxide and hydrogen to admixture with the hot gases from the heater 41. For example, the reaction products may be fractionated to include as the lightest component of the liquid fraction only the heavy ends of the naphtha fraction, permitting the lighter ends of the naphtha fraction to pass overhead with the normally gaseous hydrocarbons. If it is desired that these light ends should not be further converted the overhead gases from the separator 29 may be passed through lines 32, 76, 84 and 86 to combine with the overhead gases from fractionator 63 whereby the gasoline constituents will be condensed in cooler 66 and collected for return as reflux to fractionator 63 in separator 67. To provide maximum recovery of any such gasoline constituents it may be desired to provide means such as a line 88 for passing these overhead gases including gasoline constituents to admixture with the overhead gases from the separator 58 whereby they pass through cooler 62 and line 61 directly to fractionator 63.

It may be desired to use only a portion or a selected portion of the reaction products of the synthesis of carbon monoxide and hydrogen for admixture with the hot gases from the heater 41. If only a portion is used the undesired portion may be withdrawn from the system from line 36 through line 89. If it is desired to use only a selected portion all of the said reaction products may be withdrawn through line 89 from line 36 and passed to suitable fractionating means (not shown) after which the fraction desired for admixture with the hot gases may be reintroduced to the system through line 90.

The fractionator 12 may be operated to recover any proportion of the $C_4$ and lighter hydrocarbons and any light end of the liquid fraction separated from hydrogen and carbon monoxide and the heavier liquids as a side stream, and means may be provided to collect and conduct such side stream to either fractionator 63 or 72, as desired, to increase the concentration of hydrogen and carbon monoxide in synthesis chamber 22.

Heating means 91 may be provided in the bottoms of fractionators 49, 63 and 72 to maintain the desired temperature of the condensate collected therein and prevent the inclusion of undesired constituents.

The fractionators 12, 26, 49, 63 and 72 are provided with suitable trays or other fractionating equipment to facilitate the stripping, condensation, absorption and evaporation steps incident to fractionation.

It is to be understood that the functions of fractionators 49, 63 and 72 may be assigned to a single fractionator having a unitary structure provided with suitable means for withdrawing side streams. However, a plurality of fractionators is used here to simplify presentation of the subject matter of the invention.

The invention has been described with reference to specific modifications but it will be apparent that it is not necessarily limited thereto but is capable of other modifications and improvements not shown or described.

I claim:

1. The method of producing gasoline motor fuel of high anti-knock value which comprises reacting carbon monoxide and hydrogen over a suitable catalyst under controlled conditions of temperature and pressure whereby formation of hydrocarbons including normally liquid constituents in the gasoline boiling range is effected, separating normally gaseous hydrocarbon constituents of the products of said reaction containing more than one carbon atom per molecule, heating said separated normally gaseous constituents to effect substantial cracking thereof, admixing with said heated normally gaseous hydrocarbons after substantial cracking thereof normally liquid constituents of said carbon monoxide-hydrogen reaction products, and maintaining the resulting mixture at elevated temperature to effect conversion of normally liquid constituents thereof to gasoline constituents of high anti-knock value and polymerization of normally gaseous hydrocarbon constituents to normally liquid hydrocarbons within the motor fuel boiling range.

2. The method of producing motor fuel of high anti-knock value which comprises reacting carbon monoxide and hydrogen in the presence of a suitable catalyst and under suitable conditions of temperature and pressure to produce normally gaseous hydrocarbons including $C_3$ and $C_4$ paraffinic and olefinic hydrocarbons and normally liquid hydrocarbons including gasoline constituents, separating from said reaction products a normally gaseous fraction predominating in $C_3$ and $C_4$ paraffinic and olefinic hydrocarbons and a normally liquid fraction including gasoline constituents, heating said normally gaseous fraction at elevated temperature to effect substantial cracking of paraffinic constituents thereof, admixing said normally liquid fraction with said heated gaseous fraction after substantial cracking of paraffinic constituents thereof, and maintaining said mixture at elevated temperature to effect conversion of liquid constituents thereof to motor fuel constituents of high anti-knock value and to effect polymerization of normally gaseous olefinic constituents thereof to normally liquid hydrocarbons within the motor fuel boiling range.

3. The method of producing gasoline motor fuel of high anti-knock value which comprises reacting carbon monoxide and hydrogen over a suitable catalyst under controlled conditions of temperature and pressure to produce hydrocarbons containing more than one carbon atom per molecule including normally gaseous olefinic and paraffinic hydrocarbons and normally liquid hydrocarbons within the gasoline boiling range, simultaneously heating normally gaseous hydrocarbons containing more than one carbon atom per molecule to effect substantial cracking thereof, separating from the products of said carbon monoxide-hydrogen reaction a fraction consisting of normally liquid hydrocarbons including gasoline constituents and normally gaseous hydrocarbons having at least three carbon atoms per molecule including a substantial proportion of normally gaseous olefinic hydrocarbons, admixing said last-mentioned fraction with said heated normally gaseous hydrocarbons after substantial cracking thereof, maintaining the resulting mixture at elevated conditions of temperature and pressure to effect conversion of normally liquid constituents thereof to gasoline constituents of high anti-knock value and polymerization of normally gaseous constituents thereof to normally liquid hydrocarbons within the gasoline boiling range, fractionating said mixture after said conversion treatment to separate therefrom a gasoline fraction and a normally gaseous fraction consisting essentially of hydrocarbons containing more than one carbon atom per molecule, and heating said last-mentioned normally gaseous fraction to effect substantial cracking thereof as described.

4. A method of converting normally gaseous hydrocarbons to gasoline motor fuel of high anti-knock value which comprises subjecting a first gaseous stream consisting essentially of gaseous hydrocarbons containing less than three carbon atoms per molecule to catalytic oxidation to convert said stream substantially to carbon monoxide and hydrogen, reacting said carbon monoxide and hydrogen over a suitable catalyst under controlled conditions of temperature and pressure to form hydrocarbons having more than one carbon atom per molecule including normally liquid hydrocarbons, simultaneously heating a second gaseous stream consisting essentially of normally gaseous hydrocarbons containing more than one carbon atom per molecule to effect substantial cracking thereof, admixing with said heated normally gaseous hydrocarbons after substantial cracking thereof reaction products of said carbon monoxide-hydrogen reaction including normally liquid constituents, maintaining the resulting mixture at elevated temperature to effect conversion of normally liquid constituents thereof to gasoline constituents of high anti-knock value and to polymerize normally gaseous constituents thereof to normally liquid hydrocarbons within the gasoline boiling range, fractionating the said mixture after the said thermal conversion treatment to separate therefrom a gasoline fraction and a fixed gas fraction containing hydrocarbons having not more than two carbon atoms per molecule, and passing said fixed gas fraction to admixture with said first gaseous stream for processing as described.

5. A method of converting normally gaseous hydrocarbons to gasoline motor fuel of high anti-knock value which comprises subjecting a first gaseous stream consisting essentially of gaseous hydrocarbons containing less than three carbon atoms per molecule to catalytic oxidation to convert said stream substantially to carbon monoxide and hydrogen, reacting said carbon monoxide and hydrogen over a suitable catalyst under controlled conditions of temperature and pressure to form hydrocarbons having more than one carbon atom per molecule including normally liquid hydrocarbons, simultaneously heating a second gaseous stream consisting essentially of normally gaseous hydrocarbons containing more than one carbon atom per molecule to effect substantial cracking thereof, fractionating the reaction products of said carbon monoxide-hydrogen reaction to separate therefrom a normally liquid fraction and a gaseous fraction consisting essentially of normally gaseous hydrocarbons containing more than one carbon atom per molecule, passing said last-mentioned gaseous fraction to admixture with said second gaseous stream prior to said cracking treatment, admixing said normally liquid fraction with said heated normally gaseous hydrocarbons after a substantial cracking thereof, maintaining the resulting mixture at elevated temperature to effect conversion of normally liquid constituents thereof to gasoline constituents of high anti-knock value and to effect polymerization of normally gaseous constituents thereof to normally liquid hydrocarbons within the gasoline boiling range, fractionating said mixture after said thermal conversion treatment to separate therefrom a gasoline fraction and a fixed gas fraction containing hydrocarbons having not more than two carbon atoms per molecule, and passing said fixed gas fraction to admixture with said first gaseous stream for processing as described.

6. A method of converting normally gaseous hydrocarbons to gasoline motor fuel of high anti-knock value which comprises subjecting a first gaseous stream consisting essentially of gaseous hydrocarbons containing less than three carbon atoms per molecule to catalytic oxidation to convert said stream substantially to carbon monoxide and hydrogen, reacting said carbon monoxide and hydrogen over a suitable catalyst under controlled conditions of temperature and pressure to form hydrocarbons having more than one carbon atom per molecule including normally liquid hydrocarbons, simultaneously heating a second gaseous stream consisting essentially of normally gaseous hydrocarbons containing more than one carbon atom per molecule to effect substantial cracking thereof, separating the reaction products of said carbon monoxide-hydrogen reaction into normally liquid constituents and normally gaseous constituents, admixing normally liquid constituents of said carbon monoxide-hydrogen reaction with said heated normally gaseous hydrocarbons after substantial cracking thereof, maintaining the resulting mixture at elevated temperature to effect conversion of normally liquid constituents thereof to gasoline constituents of high anti-knock value and to effect polymerization of normally gaseous constituents thereof to normally liquid hydrocarbons within the gasoline boiling range, separating the said mixture after said thermal conversion treatment into normally liquid constituents and normally gaseous constituents, fractionating said last-mentioned normally gaseous constituents and the normally gaseous constituents separated from the products of the carbon monoxide-hydrogen reaction to separate therefrom a gaseous fraction consisting essentially of normally gaseous hydrocarbons containing more than one carbon atom per molecule, and passing said last-mentioned gaseous fraction to admixture with said second gaseous stream prior to said cracking treatment thereof for processing therewith.

7. A method of converting normally gaseous hydrocarbons to gasoline motor fuel of high anti-knock value which comprises subjecting a first gaseous stream consisting essentially of gaseous hydrocarbons containing less than three carbon atoms per molecule to catalytic oxidation to convert said stream substantially to carbon monoxide and hydrogen, reacting said carbon monoxide and hydrogen over a suitable catalyst under controlled conditions of temperature and pressure to form hydrocarbons having more than one carbon atom per molecule including normally liquid hydrocarbons, simultaneously heating a second gaseous stream consisting essentially of normally gaseous hydrocarbons containing more than one carbon atom per molecule to effect substantial cracking thereof, separating the reaction products of said carbon monoxide-hydrogen reaction into normally liquid constituents and normally gaseous constituents, admixing normally liquid constituents of said carbon monoxide-hydrogen reaction with said heated normally gaseous hydrocarbons after substantial cracking thereof, maintaining the resulting mixture at elevated temperature to effect conversion of normally liquid constituents thereof to gasoline constituents of high anti-knock value and to effect polymerization of normally gaseous constituents thereof to normally liquid hydrocarbons within the gasoline boiling range, separating the said mixture after said thermal conversion treatment into normally liquid constituents and normally gaseous constituents, fractionating said last-mentioned normally gaseous constituents and the normally gaseous constituents separated from the products of the carbon monoxide-hydrogen reaction to produce therefrom a fixed gas fraction containing hydrocarbons having not more than two carbon atoms per molecule, and passing said fixed gas fraction to admixture with said first gaseous stream for processing therewith.

HAROLD V. ATWELL.